United States Patent [19]

Osgood

[11] Patent Number: 4,885,835
[45] Date of Patent: Dec. 12, 1989

[54] METHOD OF ASSEMBLING LINE MARKER INTO SUSPENDED POWER LINE

[76] Inventor: George M. Osgood, 5539 SW. Westdale St., Portland, Oreg. 97221

[21] Appl. No.: 305,790

[22] Filed: Feb. 2, 1989

[51] Int. Cl.⁴ .................. B21D 39/03; B23P 19/04
[52] U.S. Cl. ................................ 29/463; 29/433; 116/209; 116/DIG. 33
[58] Field of Search .................. 116/209, DIG. 33; 248/63; 174/DIG. 12; 29/433, 463, 525.1

[56] References Cited

U.S. PATENT DOCUMENTS

| | | | |
|---|---|---|---|
| 3,183,883 | 5/1965 | Ruhlman et al. | 116/209 |
| 3,362,377 | 1/1968 | Hill et al. | 116/209 |
| 3,430,325 | 3/1969 | Lematta | 116/209 X |

FOREIGN PATENT DOCUMENTS

| | | | |
|---|---|---|---|
| 701422 | 1/1965 | Canada | 116/DIG. 33 |
| 1284766 | 1/1962 | France | 116/DIG. 33 |
| 579838 | 9/1976 | Switzerland | 116/DIG. 33 |

Primary Examiner—Joseph M. Gorski
Assistant Examiner—Peter Vo
Attorney, Agent, or Firm—Kolisch, Hartwell & Dickinson

[57] ABSTRACT

A power-line marker comprising a pair of hemispheric shells with open ends facing each other collectively forming essentially a sphere. On the ground, the shells are joined together in a region located on one side only of a line-receiving channel defined between the shells. While in the air, the shells are partially separable from each other, in clam-shell fashion to enable a line to be advanced into the marker ultimately to lodge in the channel. Wire anchoring assemblies protrude from the exterior of the marker used in securing the marker to a line.

2 Claims, 1 Drawing Sheet

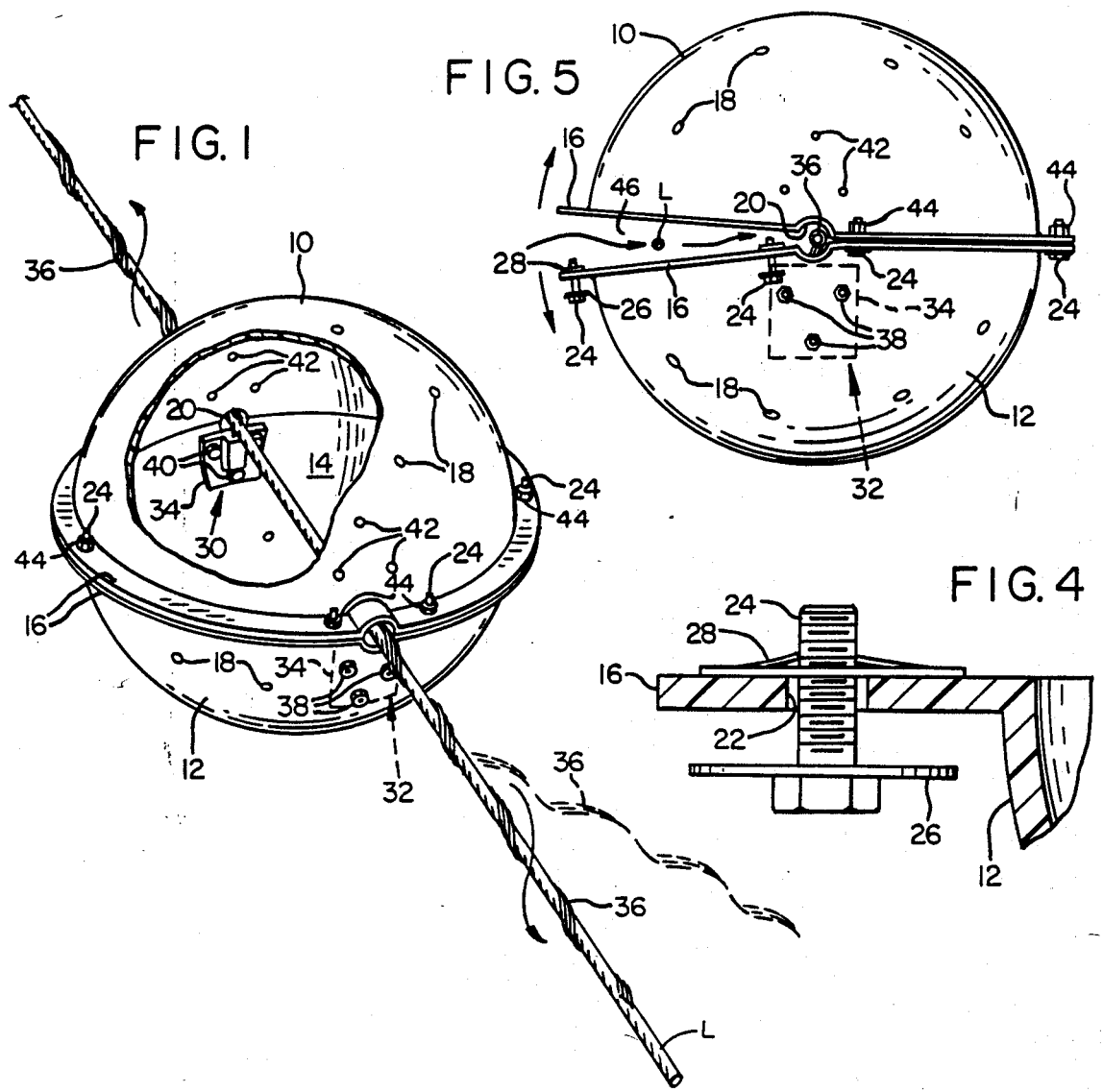
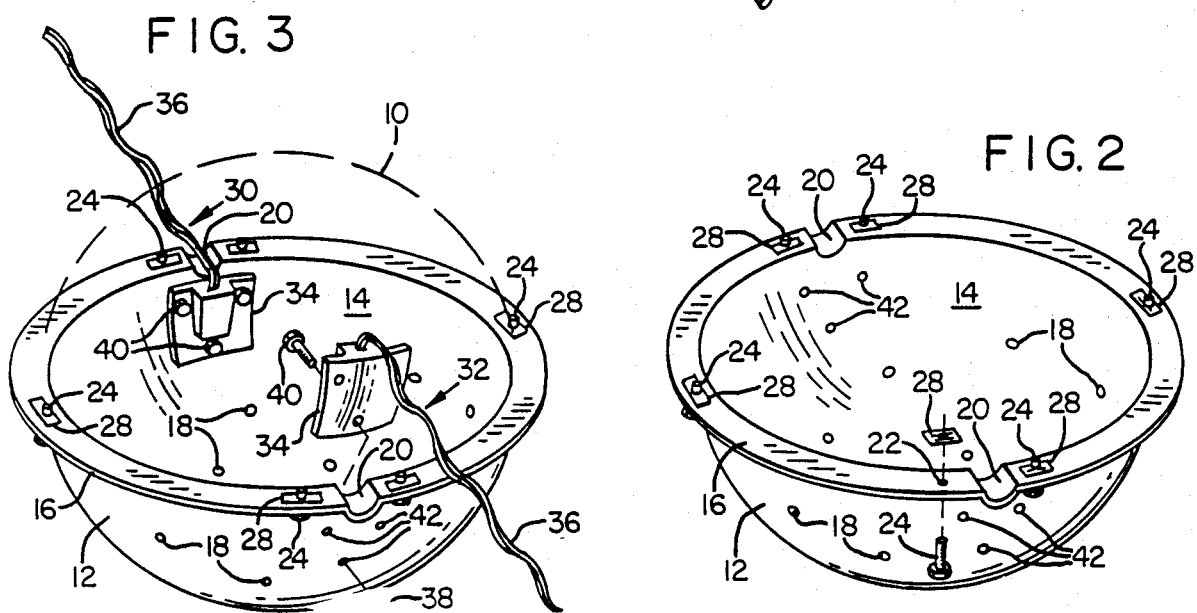

METHOD OF ASSEMBLING LINE MARKER INTO SUSPENDED POWER LINE

BACKGROUND AND SUMMARY OF THE INVENTION

This invention relates to what are referred to herein as line markers, of the type that are mounted on a suspended line, such as a suspended power line, to provide a conspicuous body relatively easily seen by pilots operating aircraft whereby a collision with the power line may be avoided.

Power transmission lines are increasingly found throughout the United States as the practice of transporting electrical power over substantial distances to different regions becomes more common. Power lines employed typically are suspended from spaced towers, and in many instances, as when the lines extend across a canyon, river, or the like, may have substantial elevation over the ground with the towers supporting them being spaced widely apart. Because of these and other factors affecting visibility, the lines represent a hazardous condition for aircraft. To reduce the hazard involved, so-called line markers have been devised which are suspended on a power line to be carried by it, and which, by reason of their size and/or color, provide a conspicuous marking alerting aircraft operators to the presence of the lines.

Mounting of a marker on a power line presents its problems because of the suspended nature of the line with which it is to receive the marker, the bulk of the marker (which makes it difficult, in many instances, to reach behind it from one side of the marker), and the number of loose parts which in the past have been required to perform the mounting operation. In general terms, this invention concerns a unique marker (and method of installation) which is readily installed from essentially one side of the marker only, and with installation performed with a minimum of number of loose parts. With the line marker contemplated, the marker may be installed utilizing, for instance, a platform suspended from a helicopter to support the workman performing the installation, with essentially a single positioning of this platform.

An object of the invention, therefore, is to provide an improved line marker which is installable on a line, such as a suspended power line, by a workman positioned in the air and on one side of the marker.

Another object is to provide a line marker which includes mating sections which envelop the line after mounting of the marker, and which are interconnected in clam-shell fashion, with the sections having limited separability in a region opposite their interconnection to accommodate the mounting operation.

In a preferred embodiment of the invention, the line marker includes a pair of oppositely disposed marker halves or sections where the halves have the same size and shape and take the form of hemispheric shells. Prior to mounting and on the ground, the hemispheric shells are secured together with the shells facing each other and open ends in registry, in a region located on one side of a passage which is defined extending between the shells for receiving the line. The shells are made of a stiff, but flexible plastic material, and when so connected, and by reason of the plastic nature of the shells, may be flexed away from each other in a region opposite the region where they are joined. Mounting of the marker is effectuated by so flexing the shells, in clam-shell fashion, and from a work station located adjacent the suspended line. One or more anchor assemblies, each of which includes a base and a length of wire extending from the base, are mounted on one or both of the shells through securement of the base described to a shell with the wire length extending outwardly from the shell. Mounting of a marker is completed by completely securing the halves described together, and by connecting, as by wrapping, the length of wire in an anchor assembly about the line, which has the effect of preventing movement of the marker axially on the line.

BRIEF DESCRIPTION OF THE DRAWINGS

These and other objects and advantages are attained by the invention, which will be described hereinbelow in conjunction with the accompanying drawings, wherein:

FIG. 1 is a perspective view, illustrating a marker as contemplated (with portions broken away to illustrate the interior of the marker) with such marker mounted on a suspended power line;

FIG. 2 is a perspective view of a marker half or section which forms part of the complete marker;

FIG. 3 is similar to FIG. 1, but shows the top section or half of the marker in dashed outline and further illustrates details of how anchor assemblies are mounted in the marker;

FIG. 4 is an enlarged cross-sectional view of a flange in a marker half, showing how a fastener is mounted thereon; and FIG. 5 is a side view of the marker, illustrating how sections or halves are flexed away from each other where unjoined to accommodate the insertion of a power line thereinto.

DETAILED DESCRIPTION OF A PREFERRED EMBODIMENT

Referring now to the drawings, the marker illustrated includes a pair of marker sections or halves indicated at 10 and 12. Each takes the form of a hemispheric or cup-shaped shell having, as may be seen with reference to marker half 12, a hollow interior 14 and an open end (which is the end which faces upwardly in FIG. 2). Bounding the open end of the shell which forms a marker half is a rim or flange 16 occupying a plane extending generally normal to the axis of curvature of the hemispheric shell in the marker half. This flange forms what is referred to herein as a mating face in the marker half or section.

The marker sections are preferably made of a stiff, but flexible plastic material (for instance, an ABS plastic). The two marker sections may be and preferably are identical, which enables them to be nested one within the other when shipping, and which contributes to economies in manufacture.

Each marker half has drain holes, such as those shown at 18, distributed about the shell which forms the marker half. This accommodates the draining of water from the interior of the marker with the marker installed on a power line.

Each marker half further has, in diametrically opposite portions of the flange 16 which forms the face of the marker half, a pair of arcuately bottom indents or recesses, shown at 20. The two recesses on diametrically opposite sides of the open end of a marker half are aligned with each other and collectively define a channel indented inwardly from the face of the marker half extending across its face, this channel being adapted to receive a line, such as a power line. The recesses further contribute a degree of flexibility to a marker half, with the arcuate bottoms of the recesses spreading slightly when the marker is flexed to accommodate line insertion, as will be explained in further detail.

In the specific form of the invention herein illustrated, flange or rim 16 is provided with six bores extending therethrough, as exemplified by bore 22. These include a pair of bores disposed on either side of each recess 20, and a pair of bores disposed in diametrically opposite portions of flange 16 located halfway around the flange extending from one recess to the other. Mounted in each of the bores is a bolt or detachable fastener, exemplified by bolt 24. Between the underside of the flange and the head of each bolt is a washer 26. Screwed onto the threaded shank of each bolt and holding the bolt loosely in place is what is referred to as a speed nut 28. The nut is a slightly conical element made of sheet material, which is readily flattened out through the advancing of a locking nut advanced along the shank of the bolt from the free end of the shank.

Illustrated at 30 and 32 are a pair of what are referred to herein as anchor assemblies. Each anchor assembly includes a base plate portion at one end, as shown at 34, which may be made of a plastic material and has a curved face matching the curvature of the inside of the shell in a marker half. Extending from this base plate portion in each anchor assembly are a series of wire strands 36 twisted in generally spiral fashion and with ends embedded in the base plate portion.

To prepare a marker for installation on a power line, while on the ground, the requisite bolts 24 are mounted in bores 22 provided in marker half 12, with washers interposed between the heads of the bolts and the underside of the flange in this marker half, and with the bolts loosely held in place with speed nuts 28. Further, a pair of anchor assemblies are mounted on the marker half with the base plate portions of these anchor assemblies inside a marker half and against the inner surface of the marker half which defines its hollow interior. The wire strands of each anchor assembly extend from the base plate portion in the anchor assembly through an adjacent recess or indent 20 and thence outwardly to the exterior of the marker half. The base plate portions of the anchor assemblies are secured in place using nuts and bolts 38, 40, with the bolts passing through accommodating bores, such as shown at 42, provided in the shell portion of the marker half.

The other marker half 10 may be then placed opposite marker half 12 as so assembled, with its mating face facing and opposite the mating face of marker half 12 and with its indents or recesses 20 opposite the indents or recesses 20 of half 12. Locking nuts, such as those shown at 44, are then tightened onto the exposed ends of the bolt shanks which are located to one side only of the channel defined by recesses 20 in the respective marker halves. This is illustrated in FIG. 5, where locking nuts 44 are tightened on the bolts 24 appearing to the right of this channel. The marker halves in a region disposed laterally and to the left of the channel in FIG. 5 are left unjoined.

In an assembly so produced, which is done on the ground, the marker halves are partially joined together, i.e., in a region disposed laterally to one side of the channel described. Laterally to the opposite side of the line-receiving channel the marker halves are unjoined, which permits them to be flexed apart. Flexing is in clam-shell fashion, to produce a space between the marker halves, shown at 46 in FIG. 5. This space provides access for a line (shown at L) to be passed between the marker halves into the line-receiving channel at the center of the marker assembly.

A marker assembly so produced is ready for in-air installation upon a suspended power line, as by a workman occupying a helicopter-supported platform providing a work station. To mount a marker in place, this workman need only flex the marker halves to separate the halves where unjoined, and then slip the assembly over the suspended power line to place the power line within the channel provided by the respective recesses 20. After such positioning, the wire strands of the anchor assemblies may be wrapped about the power line, where they extend from the marker, to hold the marker from displacement axially along the power line. Locking nuts may then be turned onto the shank portion of those bolts which provide for interconnection of the marker halves in the region of the marker halves previously left unjoined. This is easily done by an installer located at all times on one side of the marker.

Finally produced is what is illustrated in FIG. 1 comprising marker halves or sections completed secured together to form a conspicuous body suspended from the power line. The body is light in weight, being hollow, and by reason of a generally spherical shape offers minimal air resistance. The marker halves may be appropriately colored to provide maximum visibility.

It should be apparent that a marker and method of attachment are provided offering considerable advantages over prior known approaches. While a specific embodiment has been disclosed, obviously variations and modifications are possible without departing from the invention.

It is claimed and desired to secure by letters patent:

1. In the positioning of a line marker on a power line, the method comprising:

providing a pair of substantially identical hemispherical shells where a face of each shell is formed by a flange extending in a plane which bounds an open end of each shell and each shell has arcuately bottomed recesses in diametrically opposite portions of the flange which forms the face of each shell, securing a wire anchoring assembly to at least one shell by securing an end of the assembly to the interior of the shell with the remainder of the assembly extending through an arcuately bottomed recess and thence projecting through the exterior of the shell, positioning the two shells with the shells opposite each other with their said flanges facing each other and with the arcuately bottomed recesses of one shell aligned with the arcuately bottomed recesses of the other shell, thereby providing a channel extending between the shells, securing the two shells together through their said flanges at a region located laterally to one side only of said channel, with the line suspended in the air and in a station located in the air separating the faces of the shells in a region disposed opposite the first-mentioned region through flexing of the shells and passing the shells over the line to position such line within said channel, and with the line so positioned, securing the wire anchoring assembly to the line and securing the shell together with fasteners in said opposite region.

2. In the installation of a line marker on a suspended power line, using a pair of mating, hollow hemispheric shells having a degree of flexibility, where the shells have flanges bounding open ends in the shells, the method comprising:

preparing a preliminary assembly of the pair of shells by placing the two shells opposite one another, with their open ends communicating, and securing the shells together through interconnecting their said flanges to from a sphere from the shells, the shells being secured in a region which extends to greater than 180° around the perimeter of the sphere so formed and the shells being unsecured in the remaining portion of the perimeter of the sphere, the assembly further being prepared with a wire extending outwardly from the sphere so formed with the wire having a distal end remote from the sphere and a mounted end secured to the sphere, the assembly being prepared in a work station where there is ready access to all sides of the sphere so produced, moving the assembly as so prepared to the suspended line, and in a work station located in the air separating the shells where unsecured by flexing them to provide a space between the unsecured portions, inserting the line by laterally relatively moving the lines between the shells through such space, and after such insertion securing the shells together where they formerly were unsecured, the wire being secured to the power line by wrapping it around the line prior to completion of the installation.

* * * * *